(12) United States Patent
Zhou (10) Patent No.: US 10,551,708 B2
(45) Date of Patent: Feb. 4, 2020

(54) ARRAY SUBSTRATES, MANUFACTURING METHODS THEREOF AND DISPLAY PANELS

(71) Applicant: Shenzhen China Star Optoelectronics Semiconductor Display Technology Co., Ltd., Shenzhen, Guangdong (CN)

(72) Inventor: Zhichao Zhou, Guangdong (CN)

(73) Assignee: Shenzhen China Star Optoelectronics Semiconductor Display Technology Co., Ltd, Shenzhen, Guangdong (CN)

( * ) Notice: Subject to any disclaimer, the term of this patent is extended or adjusted under 35 U.S.C. 154(b) by 170 days.

(21) Appl. No.: 15/568,878

(22) PCT Filed: Jun. 23, 2017

(86) PCT No.: PCT/CN2017/089677
§ 371 (c)(1),
(2) Date: Oct. 24, 2017

(87) PCT Pub. No.: WO2018/223430
PCT Pub. Date: Dec. 13, 2018

(65) Prior Publication Data
US 2018/0356659 A1  Dec. 13, 2018

(30) Foreign Application Priority Data
Jun. 7, 2017  (CN) .......................... 2017 1 0423972

(51) Int. Cl.
*G02F 1/1368* (2006.01)
*G02F 1/1362* (2006.01)
*G02F 1/1343* (2006.01)

(52) U.S. Cl.
CPC .......... *G02F 1/1368* (2013.01); *G02F 1/1343* (2013.01); *G02F 1/1362* (2013.01); *G02F 1/13439* (2013.01); *G02F 1/134309* (2013.01); *G02F 1/136227* (2013.01); *G02F 1/136286* (2013.01); *G02F 2001/134345* (2013.01); *G02F 2001/136295* (2013.01);
(Continued)

(58) Field of Classification Search
CPC ..... H01L 27/1251; H01L 27/124–1244; G02F 1/1368; G02F 1/134309; G02F 1/13439; G02F 1/136227; G02F 1/13286
See application file for complete search history.

(56) References Cited

U.S. PATENT DOCUMENTS 7,834,971 B2  11/2010  Chen et al.
8,604,479 B2  12/2013  Lee et al.
(Continued)

FOREIGN PATENT DOCUMENTS

CN  106773408 A  5/2017
JP  2007101896 A  4/2007

*Primary Examiner* — Brigitte A Paterson
(74) *Attorney, Agent, or Firm* — Andrew C. Cheng (57) ABSTRACT

The present disclosure relates to an array substrate, a manufacturing method thereof, and a display panel. Each of the pixel areas correspondingly connects with a data line and a scanning line. In each of the pixel areas, a source of a first TFT and a gate of a second TFT are on the same layer. A gate of the first TFT, a source and a drain of the second TFT, and the scanning line are on the same layer. As such, the present disclosure may avoid the color shift of the vertical alignment (VA) display and may improve the pixel aperture rate.

12 Claims, 5 Drawing Sheets

(52) U.S. Cl.
CPC .... *G02F 2201/12* (2013.01); *G02F 2201/122* (2013.01); *G02F 2201/123* (2013.01); *G02F 2201/40* (2013.01)

(56) References Cited

U.S. PATENT DOCUMENTS

| | | |
|---|---|---|
| 9,086,587 B2 | 7/2015 | Park et al. |
| 2015/0214286 A1* | 7/2015 | Niu .................... H01L 27/3278 257/72 |
| 2016/0252791 A1 | 9/2016 | Chai |
| 2018/0102382 A1 | 4/2018 | Peng et al. |
| 2018/0217426 A1 | 8/2018 | Hao |

* cited by examiner

ARRAY SUBSTRATES, MANUFACTURING METHODS THEREOF AND DISPLAY PANELS

BACKGROUND

1. Technical Field

The present disclosure relates to display field, and particularly to an array substrate, a manufacturing method thereof, and a display panel.

2. Description of Related Art

The vertical alignment (VA) mode liquid crystal display (LCD) has been widely adopted due to the attributes, such as high contrast and wide viewing angle. A pixel within the LCD may include two sub pixels, and each of the sub pixels is configured with a thin film transistor (TFT). The two sub pixels are in different potential and are controlled by two different TFTs, so as to avoid the color shift in the VA display. However, a data line or a scanning line is required and is configured to be a charge share line in the conventional LCD display. The charge share line may occupy part of the display area, and may reduce the pixel aperture rate.

SUMMARY

The present disclosure relates to an array substrate, a manufacturing method thereof, and a display panel, which may avoid the color shift of the VA display and may improve the pixel aperture rate.

In one aspect, the present disclosure relates to an array substrate, including: a plurality of pixel areas, wherein each of the pixel areas connects with a corresponding data line and a corresponding scanning line, and each of the pixel areas is configured with a first sub pixel electrode, a second sub pixel electrode, a first thin film transistor (TFT), and a second TFT; wherein the first sub pixel electrode and the second sub pixel electrode are configured at two sides of the scanning line along an extending direction of the data line in sequence and are spaced apart from each other; a source and a gate of the first TFT respectively connects with the data line and the scanning line, and the first sub pixel electrode connects with a semiconductor pattern of the first TFT; a source, a drain, and a gate of the second TFT respectively connects with the data line, the second sub pixel electrode, and the scanning line; the source of the first TFT and the gate of the second TFT are configured on the same layer; the gate of the first TFT, the source and the drain of the second TFT, and the scanning line are configured on the same layer.

In another aspect, the present disclosure relates to a display panel, including: a display panel and an array substrate, wherein the array substrate includes: a plurality of pixel areas, wherein each of the pixel areas connects with a corresponding data line and a corresponding scanning line, and each of the pixel areas is configured with a first sub pixel electrode, a second sub pixel electrode, a TFT, and a second TFT; wherein the first sub pixel electrode and the second sub pixel electrode are configured at two sides of the scanning line along an extending direction of the data line in sequence and are spaced apart from each other; a source and a gate of the first TFT respectively connects with the data line and the scanning line, and the first sub pixel electrode connects with a semiconductor pattern of the first TFT; a source, a drain, and a gate of the second TFT respectively connects with the data line, the second sub pixel electrode, and the scanning line; the source of the first TFT and the gate of the second TFT are configured on the same layer; the gate of the first TFT, the source and the drain of the second TFT, and the scanning line are configured on the same layer.

In another aspect, the present disclosure relates to a manufacturing method, including: providing a substrate; forming a first metal layer on the substrate, wherein the first metal layer includes a first area and a second area being spaced apart from the first area, the first metal layer of the first area is configured to form the source of the first TFT, and the first metal layer of the second area is configured to form the gate of the second TFT; forming an insulation layer covering the first metal layer, wherein the insulation layer includes a first contact hole being configured above a top of the source of the first TFT, the first metal layer of the first area is exposed by the first contact hole, a second contact hole being configured above a top of the gate of the second TFT, and the first metal layer of the second area is exposed by the second contact hole; forming a semiconductor pattern within the first contact hole and above the insulation layer corresponding to a top of the first metal layer of the second area, wherein the semiconductor pattern within the first contact hole connects with the source of the first TFT; forming a second metal layer on the semiconductor pattern, wherein the second metal layer covers the insulation layer, and the second metal layer includes a third area, a fourth area, and a fifth area being spaced apart from each other, wherein the second metal layer of the third area is configured to form the data line and the gate of the first TFT, the second metal layer of the third area covers the second contact hole and connects with the first metal layer of the second area, the second metal layer of the fourth area is configured to form the source of the second TFT, and the second metal layer of the fifth area is configured to form the drain of the second TFT; forming a flat passivation layer on the second metal layer, wherein the flat passivation layer includes a third contact hole being configured above the top of the source of the first TFT, the semiconductor pattern is exposed by the third contact hole, a fourth contact hole being configured above a top of the drain of the second TFT, and the drain of the second TFT is exposed by the fourth contact hole; forming a first sub pixel electrode covering the third contact hole, wherein the first sub pixel electrode connects with the semiconductor pattern on the first TFT; forming a second sub pixel electrode covering the fourth contact hole, wherein the second sub pixel electrode connects with the drain of the second TFT In view of the above, the source of the first TFT and the gate of the second TFT are configured on the same layer, and the gate of the first TFT, the source and the drain of the second TFT, and the scanning line are configured on the same layer. As such, the two TFTs may share the scanning line, and the charge sharing line may not be required, so as to avoid the color shift in the VA display, and to improve the pixel aperture rate.

DETAILED DESCRIPTION

To clarify the purpose, technical solutions, and the advantages of the disclosure, embodiments of the invention will now be described more fully hereinafter with reference to the accompanying drawings, in which embodiments of the invention are shown. The figure and the embodiment described according to figure are only for illustration, and the present disclosure is not limited to these embodiments.

Figure 1:
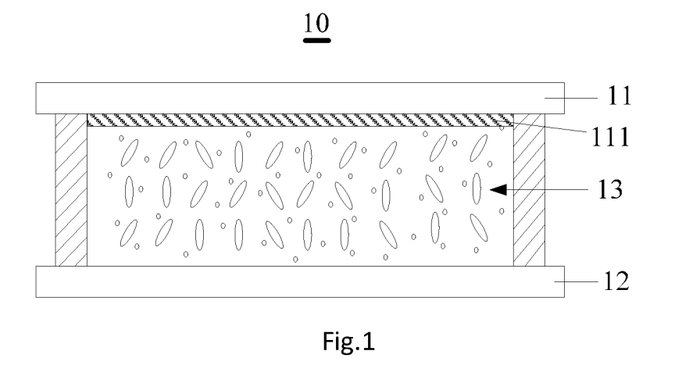
FIG. 1 is a cross sectional view of a display panel in accordance with one embodiment of the present disclosure.

Referring to FIG. 1, the present disclosure relates to a display panel. The display panel 10 includes an array substrate 12, such as a thin film transistor (TFT) substrate, a color filter (CF) substrate 11, and a plurality of liquid crystals (liquid crystal molecules) 13 configured between the array substrate 12 and the CF substrate 11, wherein the array substrate 12 and the CF substrate 11 are spaced apart from each other. The liquid crystals 13 are arranged within a liquid crystal cell, wherein the array substrate 12 and the CF substrate 11 are stacked to form the liquid crystal cell.

The CF substrate 11 includes a common electrode 111, wherein the common electrode 111 may be a transparent conductive film. Specifically, in one example, the common electrode may be an indium tin oxide (ITO) thin film.

Figure 2:
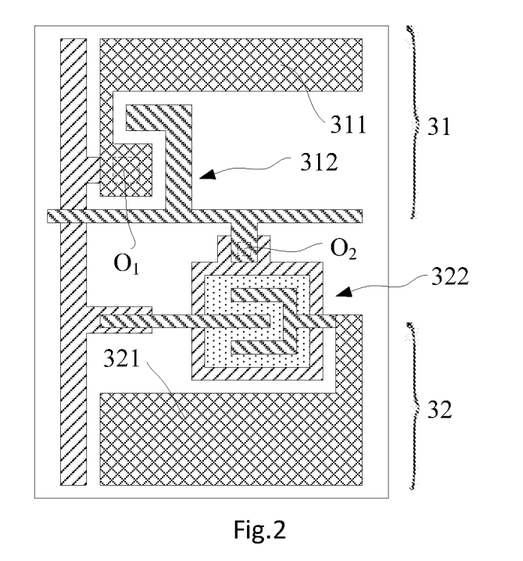
FIG. 2 is a schematic view of a pixel area in the display panel shown in FIG. 1.

The array substrate 12 includes a variety of wirings and a plurality of pixel electrodes. In one example, the array substrate 12 may include a plurality of data lines arranged along a column direction, a plurality of scanning lines arranged along a line direction, and a plurality of pixel areas formed by the data line and the scanning lines corporately. As shown in FIG. 2, one pixel area includes a sub pixel 31 and a main pixel 32. The sub pixel 31 includes a first sub pixel electrode 311 and a first TFT 312 configured to apply a gray scale voltage on the first sub electrode 311. The main pixel area 32 includes a second sub pixel electrode 321 and a second TFT 322 configured to apply the gray scale voltage on the second pixel electrode 321. Wherein the first sub electrode 311 and the second pixel electrode 321 may be configured on the same layer, and a dimension of the first sub electrode 311 may be less than a dimension of the first sub electrode 311.

Figure 3:
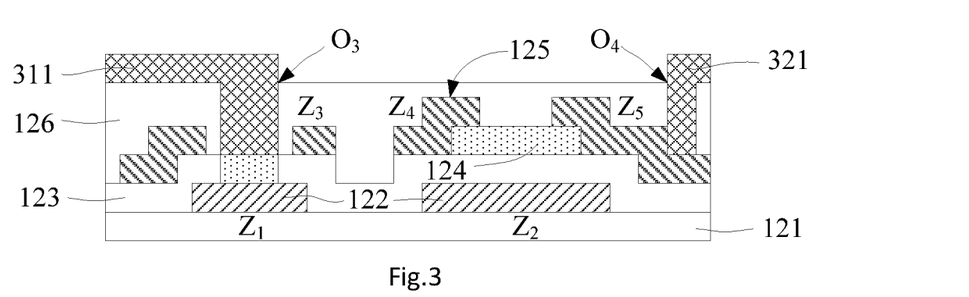
FIG. 3 is a cross sectional view of the pixel area shown in FIG. 2.

Referring to FIG. 3, within one pixel electrode, the array substrate 12 may further include a substrate 121, a first metal layer 122, an insulation layer 123, a semiconductor pattern 124, a second metal layer 125, and a flat passivation (PV) layer 126, wherein the first metal layer 122, the insulation layer 123, semiconductor pattern 124, the second metal layer 125, and the flat PV layer 126 are formed on the substrate 121 in sequence.

The first metal layer 122 includes a first area Z1 and a second area Z2 configured above the substrate 121, wherein the first area Z1 and the second area Z2 are configured on the same layer and are spaced apart from each other. The insulation layer 123 is formed on the first metal layer 122 and covers the substrate 121. The insulation layer 123 may include a first contact hole O1 configured above a top of the first metal layer 122 of the first area Z1, and the first metal layer 122 of the first area Z1 is exposed by the first contact hole O1. The insulation layer 123 further includes a second contact hole O2 configured above a top of the first metal layer 122 of the second area Z2, and the first metal layer 122 of the second area Z2 is exposed by the second contact hole O2. The semiconductor pattern 124 may include a first portion and a second portion. The first portion of the semiconductor pattern 124 is formed within the first contact hole O1 and connects with the first metal layer 122 of the first area Z1, the second portion of the semiconductor pattern 124 is formed above the insulation layer 123 corresponding to the first metal layer 122 of the second area Z2. The second metal layer 125 is configured on the same layer with the insulation layer 123. The second metal layer 125 may include a third area Z3, a fourth area Z4, and a fifth area Z5 being spaced apart from each other, wherein the second metal layer 125 of the third area Z3 covers the second contact hole O2 and connects with the first metal layer 122 of the second area Z2, the second metal layer 125 of the fourth area Z4 and the second metal layer 125 of the fifth area Z5 are configured above the first metal layer 122 of the second area Z2 and connect with the second portion of the semiconductor pattern 124. The flat PV layer 126 is formed on the second metal layer 125 corresponding to the first metal layer 122 of the first area Z1 and the flat PV layer 126 covers the insulation layer 123. The flat PV layer 126 may include a third contact hole O3 configured above the top of the second metal layer 125 of the fourth area Z4, and the semiconductor pattern 124 is exposed by the third contact hole O3. The flat PV layer 126 may further include a fourth contact hole O4, and the second metal layer 125 of the fourth area Z4 is exposed by the fourth contact hole O4.

In view of the above, the first metal layer 122 of the first area Z1 is configured to form a source of the first TFT 312 and the second metal layer 125 of the third area Z3 is configured to form a gate of the first TFT 312. The semiconductor pattern 124 above the first metal layer 122 of the first area Z1 directly connects with the first sub electrode 311, that is, the first sub electrode 311 directly connects with a drain of the first TFT 312. The first metal layer 122 of the second area Z2 is configured to form the a gate of the second TFT 322, the second metal layer 125 of the fourth area Z4 is configured to form the a source of the second TFT 322, and the second metal layer 125 of the fifth area Z5 is configured to a drain of the second TFT 322.

In one example, the first metal layer 122 of the first area Z1 may further be configured to form the data line Dn, that is, the data line $D_n$, the source of the first TFT 312, and the gate of the second TFT 322 are configured on the same layer. The data line $D_n$ may connect with the source of the second TFT 322 via the fifth contact hole O5 of the insulation layer 123, wherein the second metal layer 125 of the fourth area Z4 is exposed by the fifth contact hole O5. The second metal layer 125 of the third area Z3 is further configured to form the scanning line Gn, that is, the scanning line Gn and the source of the first TFT 312 are configured on the same layer with the source and the drain of the second TFT 322.

The first sub pixel electrode 311 and the second sub pixel electrode 321 are configured at two sides of the scanning line Gn along an extending direction of the data line Dn in sequence and the first sub pixel electrode 311 and the second sub pixel electrode 321 are spaced apart from each other. The first sub pixel electrode 311 covers the third contact hole O3, wherein the first sub pixel electrode 311 connects with the semiconductor pattern 124 above the first TFT 312. The second sub pixel electrode 321 covers the fourth contact hole O4, wherein the second sub pixel electrode 321 connects with the drain of the second TFT 322.

In the view of the above, the gate of the first TFT 312, the source of the first TFT 312 and the semiconductor pattern 124 respectively connects with the data line Dn, the scanning line Gn, and the first sub pixel electrode 311. The source, the drain, and the gate of the second TFT 322 respectively connects with the scanning line Gn, the data line Dn, and the second sub pixel electrode 321. As such, each of the pixel areas within the array substrate 12 may correspondingly connects with one scanning line Gn and one data line $D_n$.

When the display panel 10 displays and gate driving signals are applied on the scanning line Gn, the first TFT 312 connects with the second TFT 322. The first sub electrode 311 and the second pixel electrode 321 receive the gray scale voltage from the data line $D_n$, and main pixel area 32 and the sub pixel area 31 are charged to the same potential. A voltage applying process may be conducted via the common electrode 111 to configure the potential of the sub pixel area 31 to be different from the potential of the main pixel area 32. As such, the biased distribution of the liquid crystals 13 between the main pixel area 32 and the sub pixel area 31 may be different, so as to avoid the color shift effect in the vertical alignment (VA) mode display.

In view of the above, the first TFT 312 and the second TFT 322 may share one scanning line Gn and one data line $D_n$, and the charge sharing line may be excluded, so as to improve the pixel aperture rate.

Figure 4:
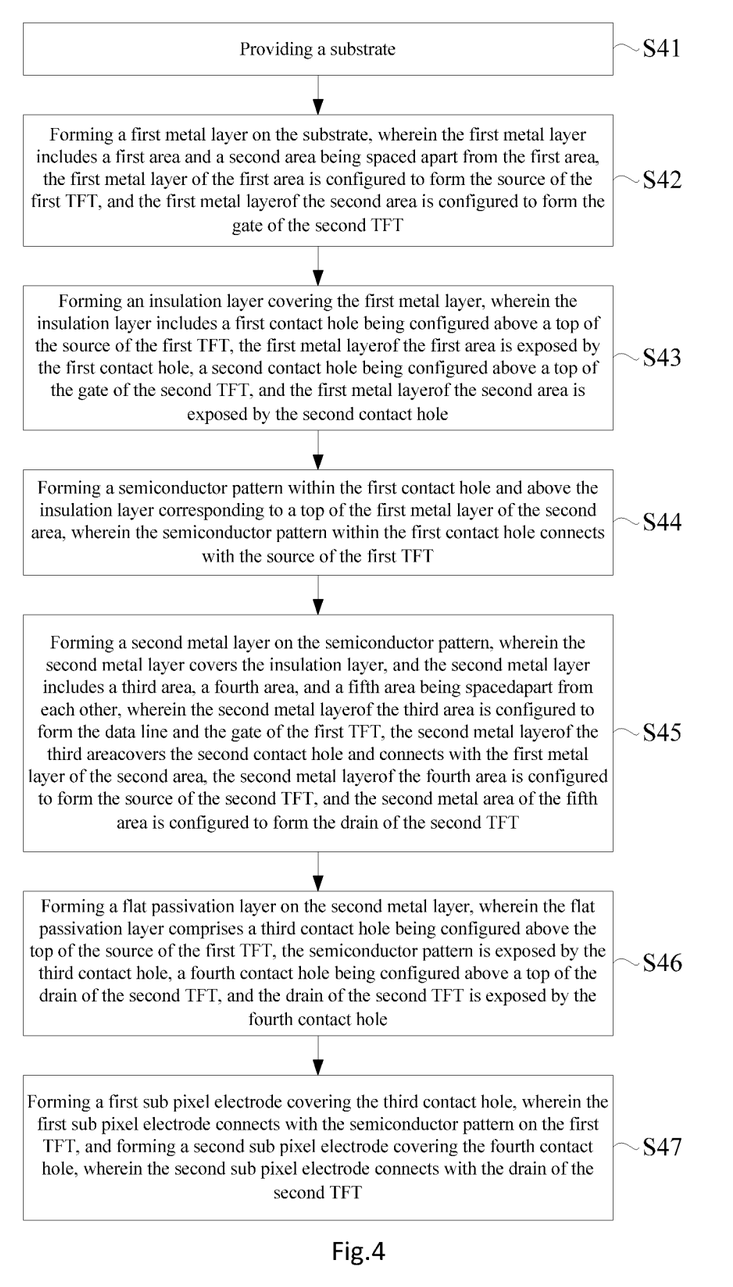
FIG. 4 is a flowchart illustrating a manufacturing method of array substrates in accordance with one embodiment of the present disclosure.

Referring to FIG. 4, the present disclosure relates to a manufacturing method of the array substrate 12, the method may include the following steps.

In step S41: providing the substrate.

Figure 5:
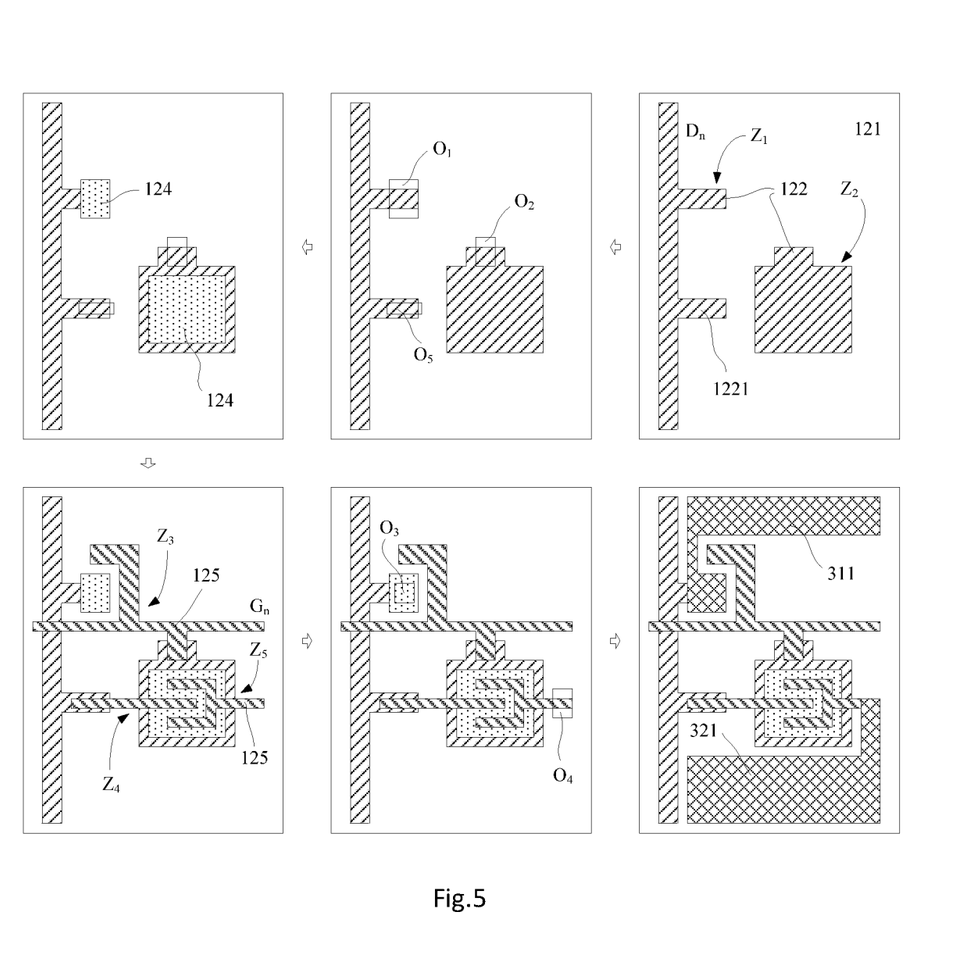
FIG. 5 is a schematic view illustrating a first scenario of an array substrate manufactured by the manufacturing method shown in FIG. 4.
Figure 6:
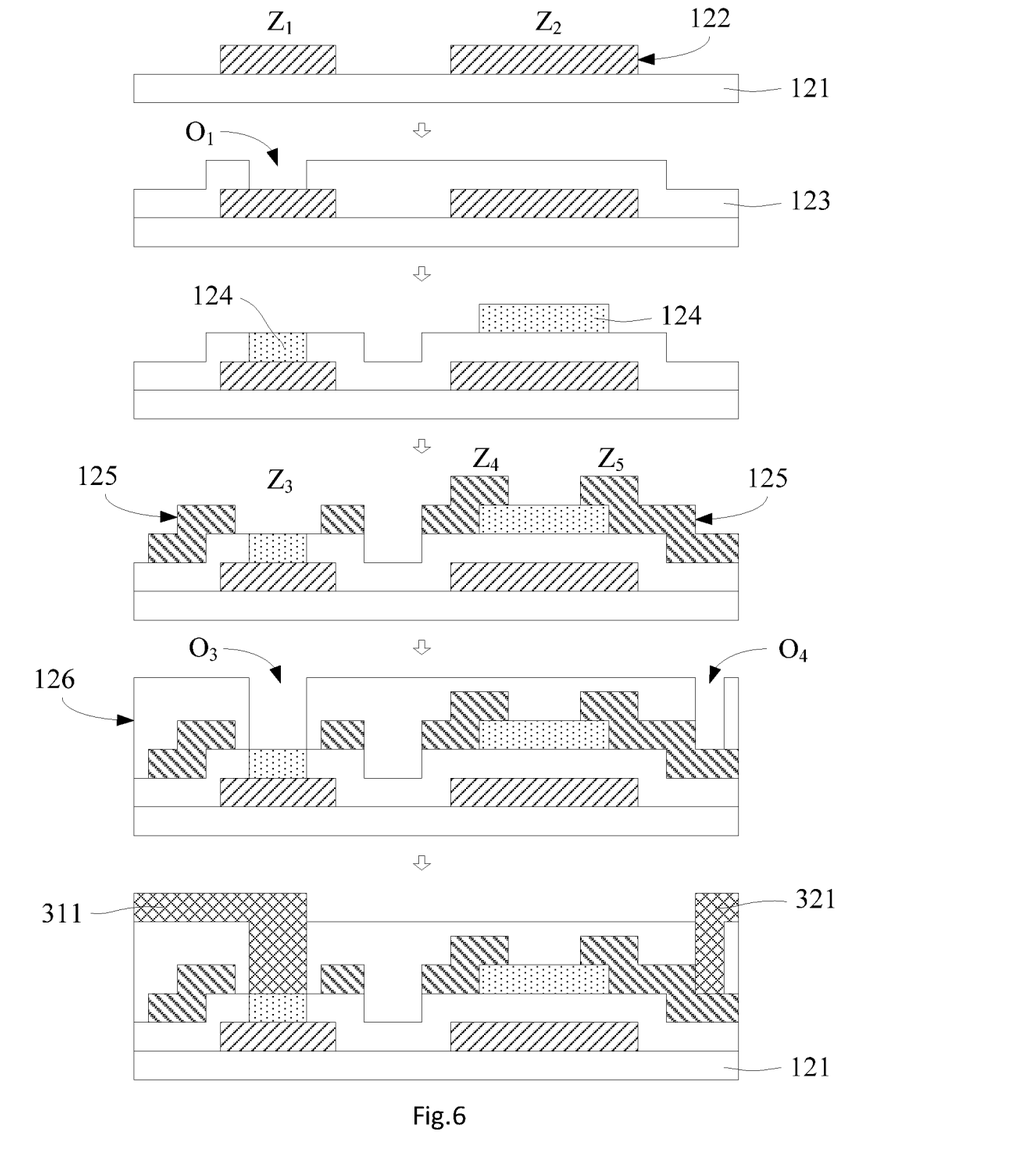
FIG. 6 is a schematic view illustrating a second scenario of an array substrate manufactured by the manufacturing method shown in FIG. 4.

Referring to FIG. 5 and FIG. 6, in one example, the substrate 121 may be made of transparent material, such as, but not limited to, glass material, plastic material, or flexible material. In another example, the substrate 121 may include the substrate and the flat PV layer configured on the substrate, wherein the substrate 121 may adopt the glass material, the plastic material, or the flexible material, and the flat PV layer may adopt, but not limited to, silicon nitride compounds, such as Si3N4.

In step S42: forming the first metal layer on the substrate, wherein the first metal layer includes the first area and the second area being spaced apart from the first area, the first metal layer of the first area is configured to form the source of the first TFT, and the first metal layer of the second area is configured to form the gate of the second TFT.

A physical vapor deposition (PVD) process is conducted on the substrate 121 to form the first metal layer in a whole surface. A patterned process is conducted on the first metal layer to reserve the first metal layer 122 of the first area Z1 and the second area Z2. Wherein the patterned process may include a photoresist coating process, an exposure process, a development process, and an etching process.

The first metal layer 122 of the first area Z1 is configured to form the source of the first TFT 312 and the first metal layer 122 of the third area Z3 is configured to form the gate of the second TFT 322.

The data line $D_n$ and a connection line 1221 extending from the data line $D_n$ to the first metal layer 122 of the second area Z2 may be formed by conducting the patterned process on the array substrate 12. The connection line 1221 is configured to connect with the source of the second TFT 322. The data line $D_n$ and the connection line 1221 are configured to be a portion of the first metal layer 122 of the first area Z1.

In step S43: forming the insulation layer covering the first metal layer, wherein the insulation layer includes the first contact hole being configured above the top of the source of the first TFT, the first metal layer of the first area is exposed by the first contact hole, the second contact hole being configured above the top of the gate of the second TFT, and the first metal layer of the second area is exposed by the second contact hole.

A chemical vapor deposition (CVD) process is conducted on the first metal layer 122 to form the insulation layer in a whole surface. The insulation layer made be made of silicon oxide, such as $SiO_x$, or the insulation layer may include a silicon oxide layer and a silicon nitride compound layer, such as a $SiO_2$ layer and a $Si_3N_4$ layer, configured on the insulation layer in sequence, so as to further improve the wear resistance and the insulation performance of the insulation layer.

The patterned process is conducted on the insulation layer to form the first contact hole O1 and the second contact hole O2 of the insulation layer 123.

As shown in FIG. 5, the fifth contact hole O5 is formed on the insulation layer 123 corresponding to a top of the connection line 1221, wherein the connection line 1221 is exposed by the fifth contact hole O5, such that the data line $D_n$ may electrically connect with the source of the second TFT 322.

In step S44: forming the semiconductor pattern within the first contact hole and above the insulation layer corresponding to the top of the first metal layer of the second area, wherein the semiconductor pattern within the first contact hole connects with the source of the first TFT.

The CVD process is conducted to form the semiconductor pattern in a whole surface, and the patterned process is conducted on the semiconductor pattern, such that only the semiconductor pattern 124 configured within the first contact hole O1 and the semiconductor pattern 124 above the first metal layer 122 of the first area Z1 may be reserved.

In another example, the CVD process may be conducted with a mask plate having a predetermined pattern to directly from the semiconductor pattern 124 having the structure described above.

In step S45: forming the second metal layer on the semiconductor pattern, wherein the second metal layer covers the insulation layer, and the second metal layer includes the third area, the fourth area, and the fifth area being spaced apart from each other, wherein the second metal layer of the third area is configured to form the data line and the gate of the first TFT, the second metal layer of the third area covers the second contact hole and connects with the first metal layer of the second area, the second metal layer of the fourth area is configured to form the source of the second TFT, and the second metal layer of the fifth area is configured to form the drain of the second TFT.

The PVD process is conducted to form the second metal layer 125. The second metal layer 125 of the third area Z3 is configured to form the gate of the first TFT 312, the second metal layer 125 of the fourth area Z4 is configure dot form the source of the second TFT 322, and the second metal layer 125 of the fifth area Z5 is configured to form the drain of the second TFT 322.

The scanning line Gn may be formed by conducting the patterned process on the array substrate 12. The scanning line Gn is configured to be a portion of the second metal layer 125 of the third area Z3.

The second metal layer 125 of the fourth area Z4 covers the fifth contact hole O5, such that the data line $D_n$ may connect with the source of the second TFT 322.

In step S46: forming the flat PV layer on the second metal layer, wherein the flat PV layer includes the third contact hole being configured above the top of the source of the first TFT, the semiconductor pattern is exposed by the third contact hole, the fourth contact hole being configured above the top of the drain of the second TFT, and the drain of the second TFT is exposed by the fourth contact hole.

The CVD process is conducted to form the flat PV layer in a whole surface, and the patterned process is conducted on the flat PV layer, so as to form the third contact hole O3 and fourth contact hole O4 of the flat PV layer 126.

In step S47: forming the first sub pixel electrode covering the third contact hole, wherein the first sub pixel electrode connects with the semiconductor pattern above the source of the first TFT, and forming the second sub pixel electrode covering the fourth contact hole, wherein the second sub pixel electrode connects with the drain of the second TFT.

In one example, the PVD process and the patterned process may be conducted to form the first sub electrode 311 and the second pixel electrode 321 at the same time. In another example, the first sub electrode 311 and the second pixel electrode 321 may be formed separately.

The pixel area manufactured by the manufacturing method has the same structure and the same effect with the pixel area shown in FIG. 2 and FIG. 3.

The above description is merely the embodiments in the present disclosure, the claim is not limited to the description thereby. The equivalent structure or changing of the process of the content of the description and the figures, or to implement to other technical field directly or indirectly should be included in the claim.

What is claimed is:

1. An array substrate, comprising:
a plurality of pixel areas, wherein each of the pixel areas connects with a corresponding data line and a corresponding scanning line, and each of the pixel areas is configured with a first sub pixel electrode, a second sub pixel electrode, a first thin film transistor (TFT), and a second TFT;
wherein the first sub pixel electrode and the second sub pixel electrode are configured at two sides of the scanning line along an extending direction of the data line in sequence and are spaced apart from each other;
a source and a gate of the first TFT respectively connects with the data line and the scanning line, and the first sub pixel electrode connects with a first semiconductor pattern of the first TFT;
a source, a drain, and a gate of the second TFT respectively connects with the data line, the second sub pixel electrode, and the scanning line;
the source of the first TFT and the gate of the second TFT are configured on a same layer;
the gate of the first TFT, the source and the drain of the second TFT, and the scanning line are configured on a same layer.

2. The array substrate according to claim 1, wherein the array substrate further comprises:
a substrate;
a first metal layer comprising a first area and a second area being spaced apart from the first area, wherein the first metal layer of the first area is configured to form the source of the first TFT, and the first metal layer of the second area is configured to form the gate of the second TFT;
an insulation layer covering the first metal layer, wherein the insulation layer comprises a first contact hole configured above a top of the source of the first TFT, the first metal layer of the first area is exposed by the first contact hole, a second contact hole above a top of the gate of the second TFT, and the first metal layer of the second area is exposed by the second contact hole;
the first semiconductor pattern being formed within the first contact hole and a second semiconductor pattern being formed above the insulation layer corresponding to a top of the first metal layer of the second area, wherein the first semiconductor pattern within the first contact hole connects with the source of the first TFT;
a second metal layer comprising a third area, a fourth area, and a fifth area being spaced apart from each other, wherein the second metal layer of the third area is configured to form the data line and the gate of the first TFT, the second metal layer of the third area covers the second contact hole and connects with the first metal layer of the second area, the second metal layer of the fourth area is configured to form the source of the second TFT, and the second metal layer of the fifth area is configured to form the drain of the second TFT;
a flat passivation layer covering the second metal layer, wherein the flat passivation layer comprises a third contact hole configured above the top of the source of the first TFT, the first semiconductor pattern is exposed by the third contact hole, a fourth contact hole configured above a top of the drain of the second TFT, and the drain of the second TFT is exposed by the fourth contact hole;
the first sub pixel electrode covering the third contact hole, wherein the first sub pixel electrode connects with the first semiconductor pattern of the first TFT;
the second sub pixel electrode covering the fourth contact hole, wherein the second sub pixel electrode connects with the drain of the second TFT;
wherein the first metal layer, the insulation layer, the first semiconductor pattern and the second semiconductor pattern, the second metal layer, the flat passivation layer, the first sub pixel electrode, and the second sub pixel electrode are formed on the substrate in sequence.

3. The array substrate according to claim 1, wherein the data line, the source of the first TFT, and the gate of the second TFT are configured on a same layer.

4. The array substrate according to claim 1, wherein the first sub pixel electrode and the second sub pixel electrode are configured on a same layer.

5. The array substrate according to claim 1, wherein a dimension of the first sub pixel electrode is less than a dimension of the second sub pixel electrode.

6. A display panel, configured with a display panel and an array substrate, wherein the array substrate comprises:
a plurality of pixel areas, wherein each of the pixel areas connects with a corresponding data line and a corresponding scanning line, and each of the pixel areas is configured with a first sub pixel electrode, a second sub pixel electrode, a first TFT, and a second TFT;
wherein the first sub pixel electrode and the second sub pixel electrode are configured at two sides of the scanning line along an extending direction of the data line in sequence and are spaced apart from each other;
a source and a gate of the first TFT respectively connects with the data line and the scanning line, and the first sub pixel electrode connects with a first semiconductor pattern of the first TFT;
a source, a drain, and a gate of the second TFT respectively connects with the data line, the second sub pixel electrode, and the scanning line;
the source of the first TFT and the gate of the second TFT are configured on a same layer;
the gate of the first TFT, the source and the drain of the second TFT, and the scanning line are configured on a same layer.

7. The display panel according to claim 6, wherein the array substrate further comprises:
a substrate;
a first metal layer comprising a first area and a second area being spaced apart from the first area, wherein the first metal layer of the first area is configured to form the source of the first TFT, and the first metal layer of the second area is configured to form the gate of the second TFT;
an insulation layer covering the first metal layer, wherein the insulation layer comprises a first contact hole configured above a top of the source of the first TFT, the first metal layer of the first area is exposed by the first contact hole, a second contact hole being configured above a top of the gate of the second TFT, and the first metal layer of the second area is exposed by the second contact hole;
the first semiconductor pattern being formed within the first contact hole and a second semiconductor pattern being formed above the insulation layer corresponding to a top of the first metal layer of the second area, wherein the first semiconductor pattern within the first contact hole connects with the source of the first TFT;
a second metal layer comprising a third area, a fourth area, and a fifth area being spaced apart from each other, wherein the second metal layer of the third area is configured to form the data line and the gate of the first TFT, the second metal layer of the third area covers the second contact hole and connects with the first metal layer of the second area, the second metal layer of the fourth area is configured to form the source of the second TFT, and the second metal layer of the fifth area is configured to form the drain of the second TFT;
a flat passivation layer covering the second metal layer, wherein the flat passivation layer comprises a third contact hole being configured above the top of the source of the first TFT, wherein the first semiconductor pattern is exposed by the third contact hole, a fourth contact hole being configured above a top of the drain of the second TFT, and the drain of the second TFT is exposed by the fourth contact hole;
the first sub pixel electrode covering the third contact hole, wherein the first sub pixel electrode connects with the first semiconductor pattern on the top of the first TFT;
the second sub pixel electrode covering the fourth contact hole, wherein the second sub pixel electrode connects with the drain of the second TFT;
wherein the first metal layer, the insulation layer, the first semiconductor pattern and the second semiconductor pattern, the second metal layer, the flat passivation layer, the first sub pixel electrode, and the second sub pixel electrode are formed on the substrate in sequence.

8. The display panel according to claim 6, wherein the data line, the source of the first TFT, and the gate of the second TFT are configured on a same layer.

9. The display panel according to claim 6, wherein the first sub pixel electrode and the second sub pixel electrode are configured on a same layer.

10. The display panel according to claim 6, wherein a dimension of the first sub pixel electrode is less than a dimension of the second sub pixel electrode.

11. A manufacturing method of array substrates, comprising:
providing a substrate;
forming a first metal layer on the substrate, wherein the first metal layer comprises a first area and a second area being spaced apart from the first area, the first metal layer of the first area is configured to form a source of a first TFT, and the first metal layer of the second area is configured to form a gate of a second TFT;
forming an insulation layer covering the first metal layer, wherein the insulation layer comprises a first contact hole being configured above a top of the source of the first TFT, the first metal layer of the first area is exposed by the first contact hole, a second contact hole being configured above a top of the gate of the second TFT, and the first metal layer of the second area is exposed by the second contact hole;
forming a first semiconductor pattern within the first contact hole and a second semiconductor pattern above the insulation layer corresponding to a top of the first metal layer of the second area, wherein the first semiconductor pattern within the first contact hole connects with the source of the first TFT;
forming a second metal layer on the first semiconductor pattern and the second semiconductor pattern, wherein the second metal layer covers the insulation layer, and the second metal layer comprises a third area, a fourth area, and a fifth area being spaced apart from each other, wherein the second metal layer of the third area is configured to form the data line and the gate of the first TFT, the second metal layer of the third area covers the second contact hole and connects with the first metal layer of the second area, the second metal layer of the fourth area is configured to form the source of the second TFT, and the second metal layer of the fifth area is configured to form the drain of the second TFT;
forming a flat passivation layer on the second metal layer, wherein the flat passivation layer comprises a third contact hole being configured above the top of the source of the first TFT, the first semiconductor pattern is exposed by the third contact hole, a fourth contact hole being configured above a top of the drain of the second TFT, and the drain of the second TFT is exposed by the fourth contact hole;
forming a first sub pixel electrode covering the third contact hole, wherein the first sub pixel electrode connects with the first semiconductor pattern of the first TFT;
forming a second sub pixel electrode covering the fourth contact hole, wherein the second sub pixel electrode and the second sub pixel electrode are configured on a same layer.

12. The manufacturing method according to claim 11, wherein a dimension of the first sub pixel electrode is less than a dimension of the second sub pixel electrode.

* * * * *